United States Patent
Anders et al.

(10) Patent No.: US 6,435,597 B1
(45) Date of Patent: Aug. 20, 2002

(54) WINDOW SEALING STRIP FOR A CONVERTIBLE

(75) Inventors: Jens Anders, Marienhagen; Martin Gentemann, Harsum, both of (DE)

(73) Assignee: Meteor Gummiwerke K.H. Bädje GmbH & Co., Bockenem (DE)

(*) Notice: Subject to any disclaimer, the term of this patent is extended or adjusted under 35 U.S.C. 154(b) by 0 days.

(21) Appl. No.: 09/856,238

(22) PCT Filed: Sep. 8, 2000

(86) PCT No.: PCT/EP00/08780
§ 371 (c)(1),
(2), (4) Date: May 16, 2001

(87) PCT Pub. No.: WO01/21426
PCT Pub. Date: Mar. 29, 2001

(30) Foreign Application Priority Data

Sep. 17, 1999 (DE) ........................ 299 16 352 U

(51) Int. Cl.[7] .............. B60J 7/00; E06B 7/16
(52) U.S. Cl. .............. 296/107.07; 296/107.01; 296/146.9; 49/490.1; 49/498.1
(58) Field of Search .............. 296/107.07, 107.05, 296/107.04, 146.9, 135; 49/490.1, 498.1

(56) References Cited

U.S. PATENT DOCUMENTS

| | | | | |
|---|---|---|---|---|
| 4,266,824 A | * | 5/1981 | Inamoto | 49/490.1 |
| 4,702,039 A | * | 10/1987 | Bocchinfuso | 49/490.1 |
| 4,761,917 A | * | 8/1988 | Knecht et al. | 49/490.1 |
| 4,869,945 A | * | 9/1989 | Harney | 49/490.1 |
| 4,970,102 A | * | 11/1990 | Guillon | 49/490.1 |
| 4,976,068 A | * | 12/1990 | Keys | 49/490.1 |
| 5,010,689 A | * | 4/1991 | Vaughan | 49/490.1 |
| 5,014,464 A | * | 5/1991 | Dupuy et al. | 49/490.1 |
| 5,040,333 A | * | 8/1991 | Mesnel et al. | 49/490.1 |
| 5,209,019 A | | 5/1993 | Morita | 49/490.1 |
| 5,257,791 A | * | 11/1993 | Cittadini et al. | 49/490.1 |
| 5,575,485 A | * | 11/1996 | Merla et al. | 49/490.1 |
| 5,618,608 A | * | 4/1997 | Teishi | 49/490.1 |
| 5,755,071 A | * | 5/1998 | Drozd | 49/490.1 |
| 5,791,722 A | | 8/1998 | Nozaki et al. | 296/146.9 |
| 5,840,401 A | * | 11/1998 | Baesecke | 49/490.1 |
| 5,848,819 A | * | 12/1998 | Sautter, Jr. | 296/107.07 |
| 5,882,766 A | | 3/1999 | Baumann | 428/122 |
| 6,030,022 A | * | 2/2000 | Bormann et al. | 296/107.01 |
| 6,082,048 A | * | 7/2000 | Backes et al. | 49/490.1 |
| 6,245,409 B1 | * | 6/2001 | Cook | 49/490.1 |
| 6,247,271 B1 | * | 6/2001 | Fioritto et al. | 49/490.1 |
| 6,279,987 B1 | * | 8/2001 | Keeney et al. | 296/146.9 |
| 2001/0013204 A1 | * | 8/2001 | Klein et al. | 49/495.1 |
| 2001/0027622 A1 | * | 10/2001 | Mine et al. | 49/490.1 |

FOREIGN PATENT DOCUMENTS

| | | | | |
|---|---|---|---|---|
| DE | 3836687 | * | 5/1990 | |
| DE | 39 21 760 C 2 | | 1/1991 | B60J/10/04 |
| DE | 39 29 159 A 1 | | 3/1991 | B60J/10/00 |

(List continued on next page.)

*Primary Examiner*—Ken Patel
(74) *Attorney, Agent, or Firm*—Synnestvedt & Lechner LLP

(57) ABSTRACT

A profiled seal for sealing between a vertically sliding window pane and a roof frame of a convertible automobile comprises a length of profiled elastomer which is co-extruded with a metal reinforcement. The profiled seal has a three-dimensional shape and can be fixed to connection parts of the roof frame. A holding section having a U-shaped cross-section is part of the length of profiled elastomer and contains the embedded reinforcement which is likewise U-shaped in cross-section. A sealing section is formed laterally as one on a first limb of the holding section which can be placed in a self-clamping and sealing manner on an attachment flange. A foot formed as one on the first limb comprises on a first longitudinal edge adjacent to a free longitudinal edge of the first limb a longitudinal groove into which a dimensionally stable edge flange of a roof of the convertible engages.

21 Claims, 6 Drawing Sheets

FOREIGN PATENT DOCUMENTS

| | | | |
|---|---|---|---|
| DE | 41 26 273 A 1 | 2/1993 | ........... B62D/65/00 |
| DE | 295 02 105 | 3/1995 | ........... F16J/15/12 |
| DE | 43 39 896 A 1 | 5/1995 | ........... B60J/10/02 |
| DE | 4435297 | * 10/1995 | |
| DE | 44 41 667 C 1 | 12/1995 | ............. B60J/7/12 |
| DE | 297 15 485 U 1 | 6/1998 | .............. B60J/7/08 |
| DE | 198 11 362 A 1 | 9/1999 | ........... F16J/15/10 |
| EP | 0 587 428 A1 | 3/1994 | ........... B60J/10/06 |
| GB | 2 074 639 A | 11/1981 | .............. B60J/1/02 |
| WO | WO 97/00180 | 1/1997 | ........... B60J/10/10 |

* cited by examiner

WINDOW SEALING STRIP FOR A CONVERTIBLE

BACKGROUND OF THE INVENTION

The invention relates to a profiled seal for providing a sealing arrangement between a vertically sliding window pane and a roof frame of a cabriolet.

A known profiled seal of this type (German Pat. No. DE 198 11 362 A1) is attached to a motor vehicle body by placing it on a fold in the car body. Projections in the holding section which protrude on both sides of the fold against the profiled seal are used to attach said profiled seal to the car body.

In the case of a profiled seal known per se (WO 97/00180 A1; FIGS. 2, 3, 6 and 7) the window pane comes into contact with two opposite lying sealing lips. The sealing lips form longitudinal edges of the length of profiled elastomer. The attachment elements penetrate the length of profiled elastomer and the carrier rail and are mounted through the sealing lips on the connection part. It is possible for dust and/or moisture to collect in an undesired manner above the sealing lips inside the profiled seal. Moreover, it is necessary to cut the profiled seal into sections and each section must be stretch-bent into the required three-dimensional shape using costly tools.

German Patent No. DE 39 21 760 C2 discloses a profiled seal known per se which is provided for window panes which can be raised and lowered in motor vehicles, which profiled seal is placed on a flange of a window frame.

It is known per se from German Pat. No. DE 295 02 105 U1 to dispose a U- shaped reinforcement in the form of a twisted wire body in a U-shaped clamping section of a profiled seal. A tubular sealing section of the profiled seal is integrally formed on a cross-piece of the clamping section.

It is known per se to produce a holding rail as an extruded aluminium profile, to stretch-bend it into the desired three-dimensional shape and to attach it by means of attachment elements to the connection part. Only then is the length of profiled elastomer inserted on the motor vehicle assembly line into the receiving devices on both sides of the holding rail. This is time-consuming and costly.

It is known per se from Great Britain Pat. No. GB 2 074 639 A to attach a sheet metal holding element, which is substantially L-shaped in cross-section, to a roof frame by means of screws. Before the screws are tightened, an edge region of a tubular seal is placed behind a longitudinal edge of the holding element as shown in FIG. 4. After the screws have been tightened, a clamping profile of the tubular seal is placed onto a cross-piece of the holding element lying opposite the longitudinal edge.

In accordance with German Patent No. DE 297 15 485 U1, it is known per se to provide a profiled metal support with projections lying opposite each other at a spaced interval. Complementary shoulders of a tubular sealing strip are clipped or pushed over the projections.

SUMMARY OF THE INVENTION

The object of the invention is to develop the profiled seal such that the first limb of the holding section is held in a particularly favorable sealing arrangement on the attachment flange of the connection part.

This object is achieved by an inventive profiled seal for providing a sealing arrangement between a vertically sliding window pane and a roof frame of a cabriolet. The profiled seal includes a length of profiled elastomer which is co-extruded with a metal reinforcement. The profiled seal has a three-dimensional shape and can be fixed to the connection parts of the roof frame. The profiled seal includes a holding section which has a substantially U-shaped cross-section. The holding section is part of the length of profiled elastomer and contains the embedded reinforcement which likewise has a U-shaped cross-section. The holding section can be placed on an attachment flange of the connection part in a self-clamping and sealing manner. A sealing section of the length of profiled elastomer is integrally formed laterally on a first limb of the holding section and includes a foot formed onto the first limb. The foot comprises a longitudinal groove on a first longitudinal edge which is adjacent to a free longitudinal edge of the first limb. A dimensionally stable edge flange of a roof of the cabriolet engages in the longitudinal groove.

As the dimensionally stable edge flange of the roof of the cabriolet engages into the longitudinal groove, the first limb of the holding section can be pushed against the attachment flange.

The roof which forms part of the roof frame can be a folding roof cover or a multi- piece, hard folding roof. The roof frame can if necessary also include the A-column of the cabriolet. The reinforcement consists for example of a metal punched strip or comprises a twisted wire body. The length of profiled elastomer is optionally co- extruded from a plurality of different elastomers. The profiled seal is preferably produced such that the planar reinforcement is first extruded within the length of the profiled elastomer. After the co-extrusion the holding section is bent into a U-shape together with the reinforcement inside it. It is not necessary to stretch-bend the profiled seal produced in this manner. On the contrary, the profiled seal with its holding section is simply pushed onto the attachment flange of the connection part. Because it is possible to deform the reinforcement in a three-dimensional manner, the entire profiled seal can also be bent easily into a final three-dimensional shape and assembled in this shape on the connection part. It is not necessary to provide any attachment elements, such as screws, and this has a favorable effect on the assembly costs on the production line of the cabriolet. Because of the lateral integral formation of the sealing section on the first limb of the holding section, the profiled seal has a structure which is particularly compact and functionally safe.

In certain embodiments, the edge flange, in combination with the connection part, is a component of an outer metal sheet of a roof part of a hard folding roof, or is formed on the connection part of the roof frame, which is convenient and functionally safe.

In other embodiments, the free longitudinal edge of the first limb can be pressed in cooperation with the edge flange on a sealing surface of the attachment flange. This contributes to a firm and tight seat of the holding section on the attachment flange.

This effect is also supported by a profiled seal in which a hook-shaped end lip of the first limb protrudes into the longitudinal groove and the end lip lies prestressed against a supporting surface, facing the sealing surface, of the edge flange.

In another embodiment, the profiled seal's end lip engages in a locking manner behind a longitudinal rib of the edge flange, which rib extends in a direction of the sealing surface. This arrangement of the end lip produces a positive-locking arrangement between the profiled seal and the connection part.

In another embodiment, the profiled seal's foot has, outside the longitudinal groove, a sealing lip which lies prestressed in a sealing manner against the roof. This improves the manner in which the associated gap is sealed against moisture and noise.

This effect is further enhanced by a profiled seal having a sealing lip that lies against a longitudinal edge of a cover material of a folding roof cover, or a sealing lip that lies against the outer metal sheet of the roof part of the hard folding roof.

In another embodiment, the limb of the length of profiled elastomer extends outwards at an angle from a second longitudinal edge, remote from the first longitudinal edge, of the foot, and a membrane of the length of profiled elastomer is attached between a free longitudinal edge of the limb and the first longitudinal edge of the foot and produces a hollow cavity in the length of profiled elastomer and this cavity partly receives the window pane as it closes. As this hollow cavity is normally hermetically sealed, neither dust nor moisture can penetrate into the hollow cavity and adversely affect the window pane.

In certain embodiments, the window pane comes into sealing contact with the membrane when the pane is in the uppermost region of its travel. Accordingly, a good sealing arrangement is produced between the closed window pane and the membrane.

In accordance with certain embodiments, the foot and limb consist of soft rubber and the membrane consists of expanded rubber. The soft rubber can have a hardness of 60 Shore A and the expanded rubber can have a hardness of for example 15 Shore A. Soft rubber and expanded rubber are preferably co-extruded together with the reinforcement using the duplex method.

In accordance with certain other embodiments, the metals reinforcements consist of a punched strip or a twisted wire body, which are inexpensive and in every respect functionally safe.

BRIEF DESCRIPTION OF THE DRAWINGS

These and other advantages and features of the invention are further described hereinunder with reference to the exemplified embodiments illustrated in the drawings, in which.

DETAILED DESCRIPTION

Figure 1:
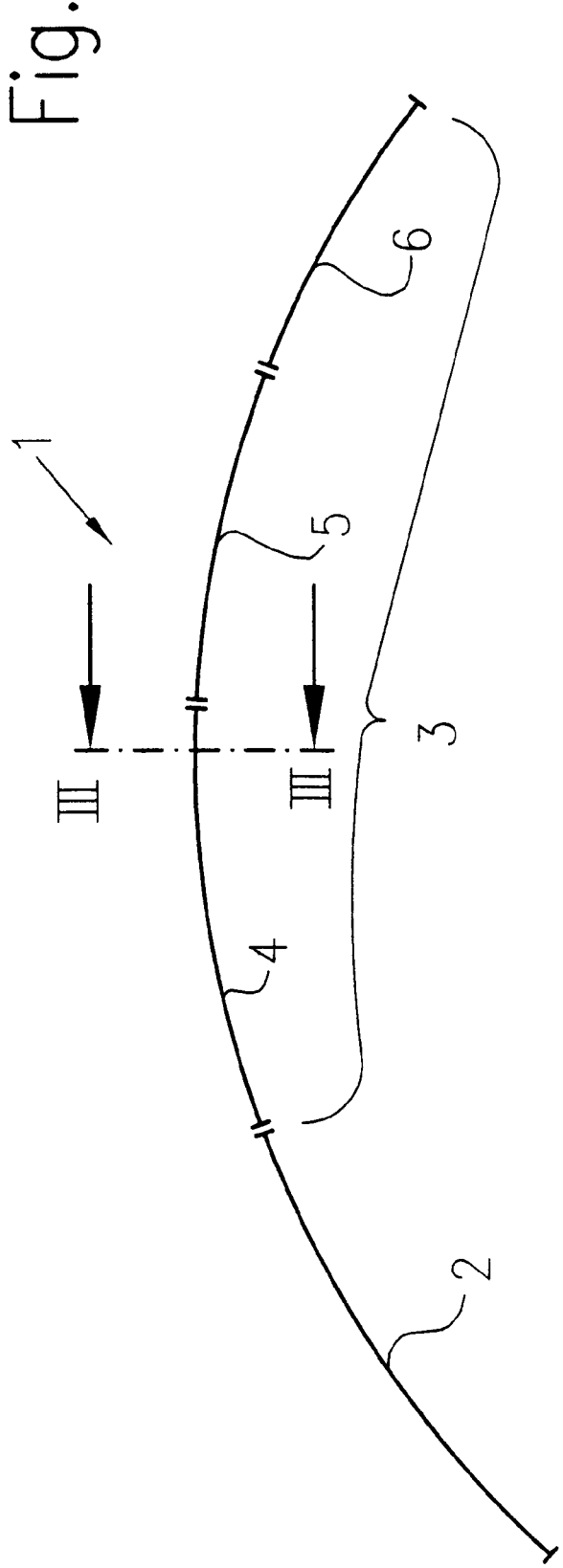
FIG. 1 shows a schematic illustration of the roof region of a cabriolet with a folding roof cover.

Referring to FIG. 1, a roof frame 1 of a cabriolet comprises in a schematic illustration an A-column 2 and a three-part folding roof cover 3 having a roof frame I 4, a roof frame II 5 and a roof frame III 6.

Like parts are provided with like reference numerals in all the drawings.

Figure 2:
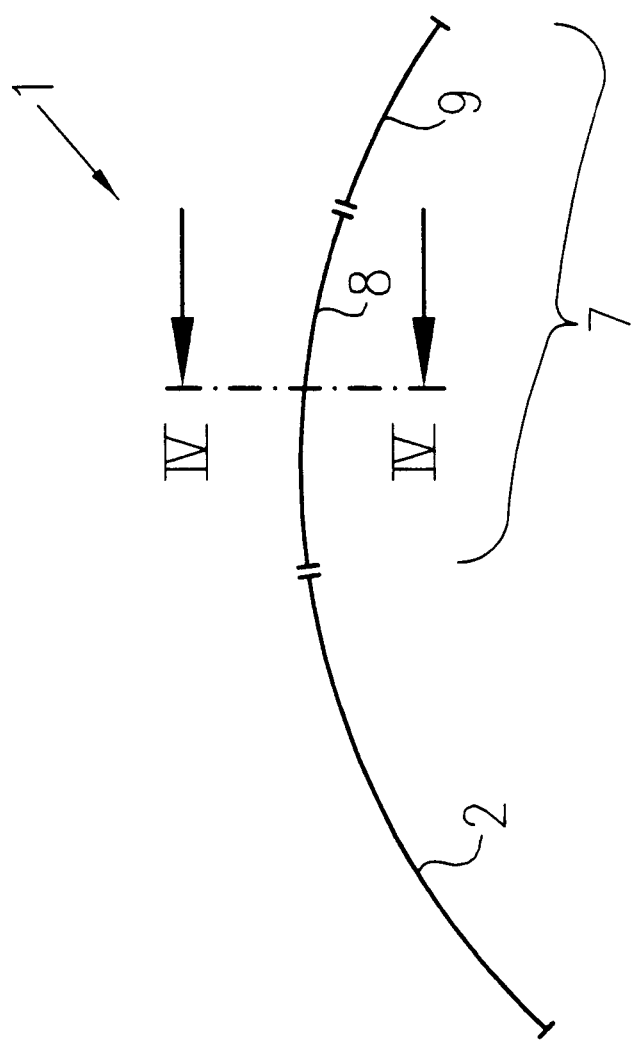
FIG. 2 shows a schematic illustration of the roof region of a cabriolet with a hard folding roof.

FIG. 2 illustrates the roof frame 1 of a cabriolet which comprises the A-column 2 and a two-part hard folding roof 7 with a roof frame I 8 and a roof frame II 9.

Figure 3:
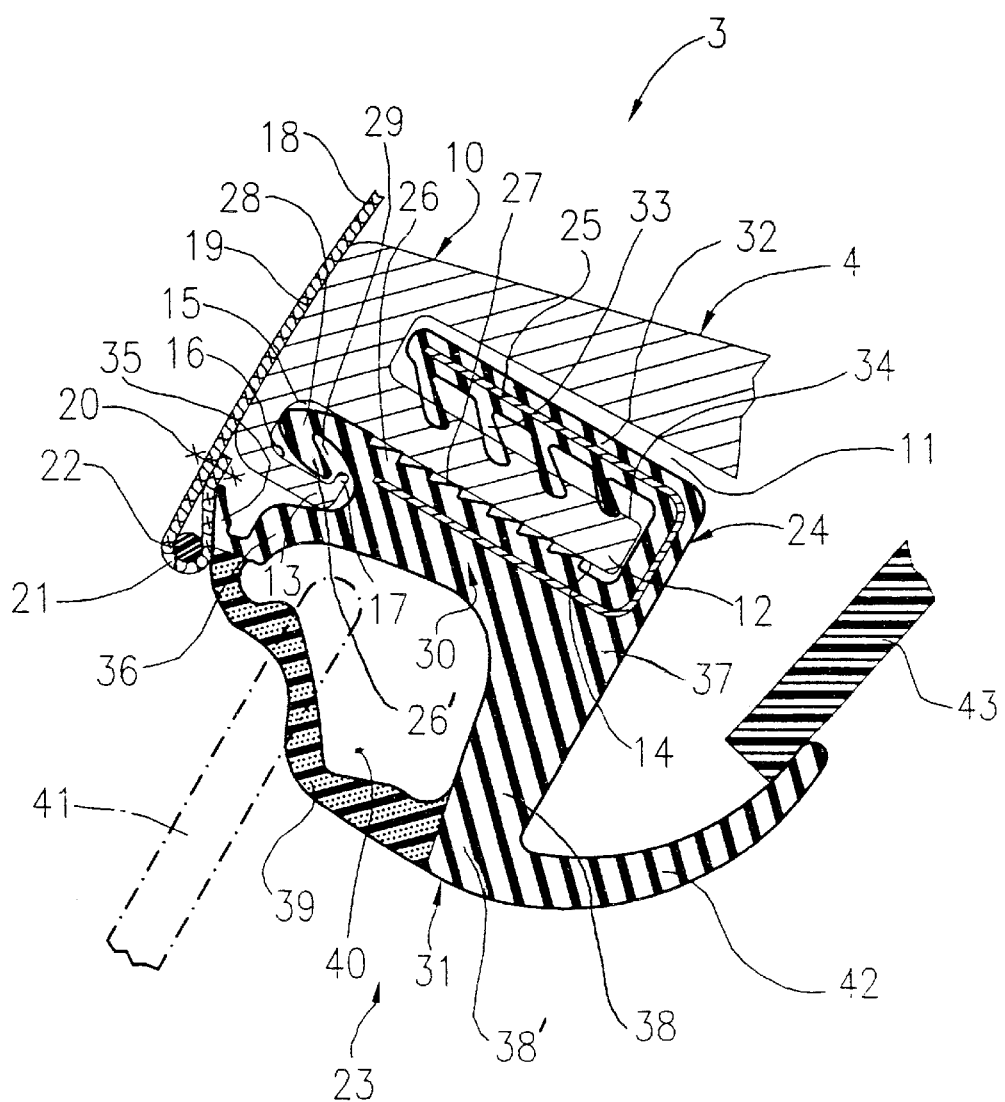
FIG. 3 shows an enlarged sectional view along the line III—III in FIG. 1.

In accordance with FIG. 3, the roof frame I 4 of the folding roof cover 3 is provided with a three-dimensional connection part 10, which consists for example of cast aluminium. The connection part 10 comprises a groove 11, an attachment flange 12 and an edge flange 13. A sealing surface 14 of the attachment flange 12 faces the edge flange 13. A longitudinal channel 15 is formed in the connection part 10 between the edge flange 13 and the sealing surface 14. A support surface 16 of the edge flange 13 lies in a spaced disposition opposite the sealing surface 14. The edge flange 13 comprises on its free longitudinal edge a longitudinal rib 17 which extends in the longitudinal channel 15.

A cover material 18 of the folding roof cover 3 is drawn over a support surface 19 of the connection part 10 and provided at its free longitudinal edge with a loop 21 formed by a seam 20. A synthetic material rod 22 of the folding roof cover 3 is disposed in the loop.

A profiled seal 23 comprises a holding section 24 which has a substantially U- shaped cross-section A metal reinforcement 25 which is formed from a punched strip and which likewise has a U-shaped cross-section is embedded in the holding section 24. The holding section 24 is self-clamping and placed in a sealing manner on the attachment flange 12. A first limb 26 of the holding section 24 is provided with a longitudinal continuous, saw toothlike profile 27 which is pushed against the sealing surface 14. The profile 27 provides in a labyrinth-type manner for an extremely good sealing arrangement between the holding section 24 and the attachment flange 12. A hook-like end lip 28 of the first limb 26 having a longitudinal edge 26' protrudes on one side into the longitudinal channel 15 and on the other side into a longitudinal groove 29 of a foot 30 of a sealing section 31 of the profiled seal 23, which foot 30 is integrally formed to the side of the fist limb 26. The end lip 28 lies prestressed against the support surface 16 and improves the sealing arrangement between the first limb 26 and the sealing surface 14. The free longitudinal end edge 26' of the end lip 28 engages behind the longitudinal rib 17 in the assembled end position of the profiled seal 23. This produces to a certain extent a positive-locking arrangement between the profiled seal 23 and the connection part 10. In so doing, the edge flange 13 and its longitudinal rib 17 engage into the longitudinal groove 29.

A second limb 32 of the holding section 24 is disposed in the assembled end position of the holding section 24 in the groove 11 and comprises on its inner side ribs 33 which are illustrated in FIG. 3 in the conventional manner in their fully relaxed position. The ribs 33 lie in the assembled end position of the holding section 24 prestressed against a counter surface 34 of the attachment flange 12. The ribs 33 promote in this way the pressing in a sealing manner of the first limb 26 against the sealing surface 14.

The foot 30 comprises outside the longitudinal grove 29 a sealing lip 35 which lies prestressed in a sealing manner against the loop 21 of the cover material 18.

The longitudinal groove 29 is formed in a first longitudinal edge 36 of the foot 30. A limb 38 of the profiled seal 23 extends at an angle of approximately 90° outwards from a second longitudinal edge 37 of the foot 30 which is remote from the first longitudinal edge 36. A membrane 39 of the profiled seal 23 is attached between a free longitudinal edge 38' of the limb 38 and the first longitudinal edge 36 of the foot 30. As a consequence, a hollow cavity 40 is formed in the profiled seal 23. A vertically sliding side window pane 41 of the cabriolet is illustrated in its uppermost closed end position by the dotted line in FIG. 3. In this end position the window pane 41 lies in a sealing manner against the membrane 39.

A cover lip 42, which engages in the assembled end position over an inner cladding 43 of the cabriolet, is formed as one on the side, opposite the membrane 39, of the free longitudinal edge of the limb 38.

The holding section 24- with the exception of its reinforcement 25 -, the foot 30, the sealing lip 35, the limb 38 and the sealing lip 42 consist of soft rubber, whereas the membrane 39 is produced from expanded rubber.

Figure 4:
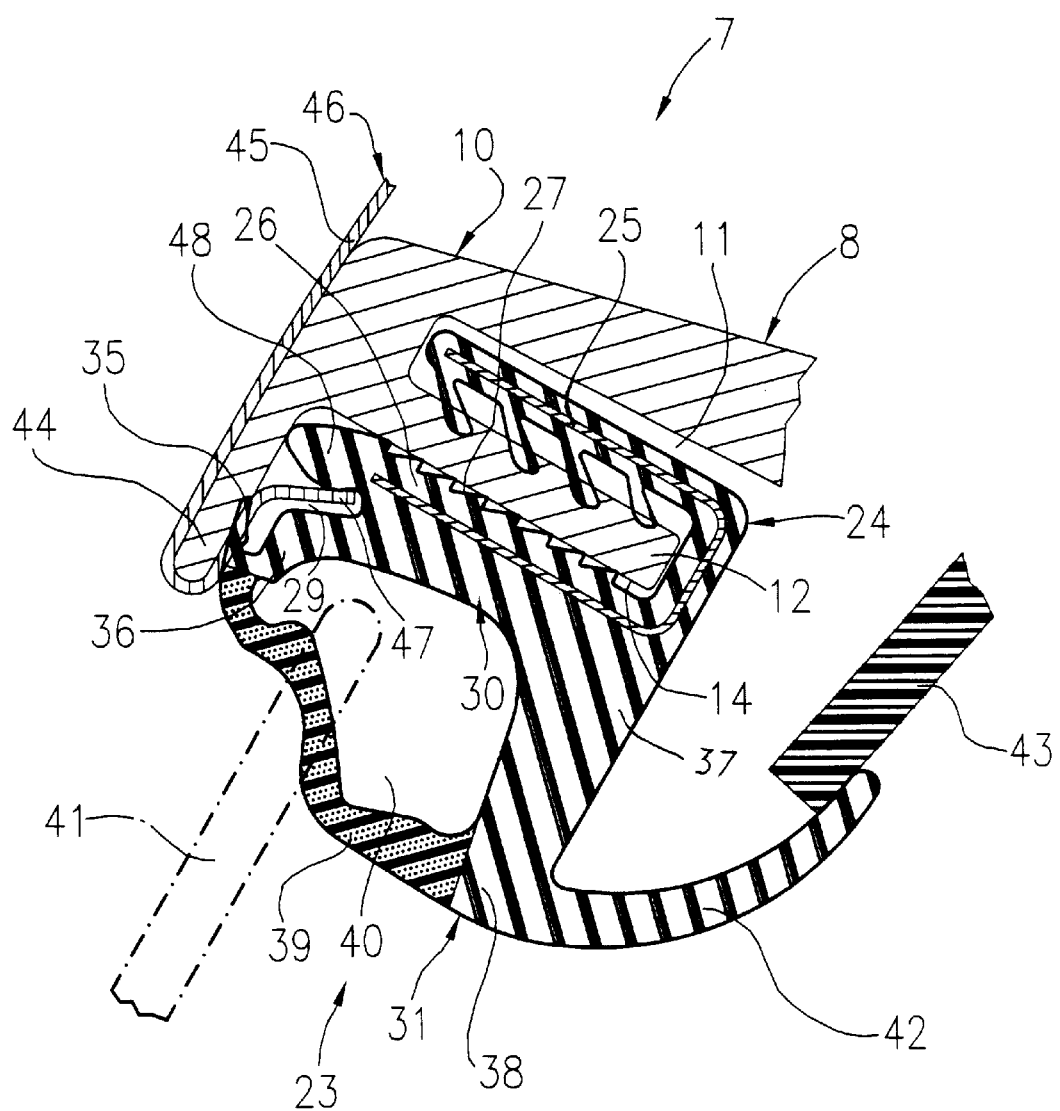
FIG. 4 shows an enlarged sectional view along the line IV—IV in FIG. 2.

In the exemplified embodiment in accordance with FIG. 4 the three- dimensional connection part 10 of the roof frame 8 is provided with a flange 44. A lacquered, visible outer piece of sheet metal 45 of an associated roof part 46 of the folding roof 7 surrounds the flange 44. The outer sheet metal 45 comprises an inwardly curved, dimensionally stable edge flange 47 which engages into the longitudinal groove 29 in the foot 30.

The outer sheet metal 45 can, for example, be adhered to the flange 44. The sealing lip 35 lies in the assembled end position of the sealing profile 23 in a sealing manner against the outer sheet metal and/or against the edge flange 47. A sealing edge 48 made from soft rubber is formed as one on the first longitudinal edge 36 of the foot 30 and on the first limb 26 of the holding section 24. The sealing edge 48 lies prestressed on the one hand against the edge flange 47 and on the other hand, likewise prestressed, against the sealing surface 14 of the attachment flange 12.

The sealing edge 48 and the first limb 26 are held by means of the edge flange 47 in a good sealing position against the sealing surface 14. The sealing edge 48 engages behind the end flange 47 in the assembled end position in accordance with FIG. 4 and ensures in this manner for a specific positive-locking arrangement of the profiled seal 23 against the connection part 10.

Figure 5:
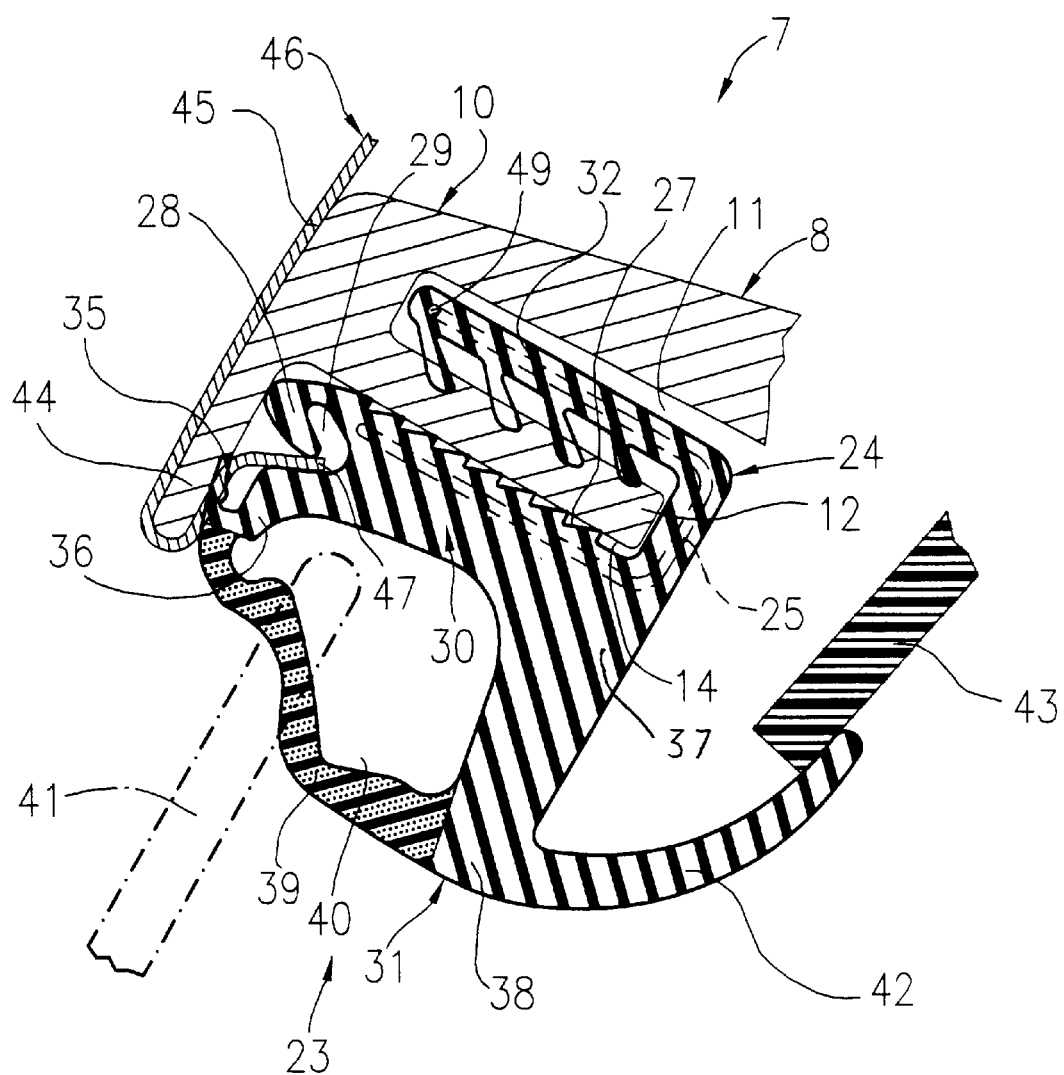
FIG. 5 shows a sectional view corresponding to FIG. 4 through a different embodiment comprising a twisted wire body as the reinforcement, and FIGS. 6 to 10 each show a plan view of different embodiments of suitable reinforcements made from a punched strip.

The exemplified embodiment in accordance with FIG. 5 is similar to that shown in FIG. 4. Referring to FIG. 5, however, the metal reinforcement 25 comprises a twisted wire body 49 of a type well known. In place of the sealing edge 48 as shown in FIG. 4, in FIG. 5 the hook-like end lip 28 as shown in FIG. 3 is used. This end lip 28 lies prestressed on the side of the edge flange 47 in the upper position in FIG. 5 and in this manner locks the profiled seal 23 with respect to the connection part 10.

FIGS. 6 to 10 each illustrate different embodiments of the metal reinforcement 25 as punched strips.

Figure 6:
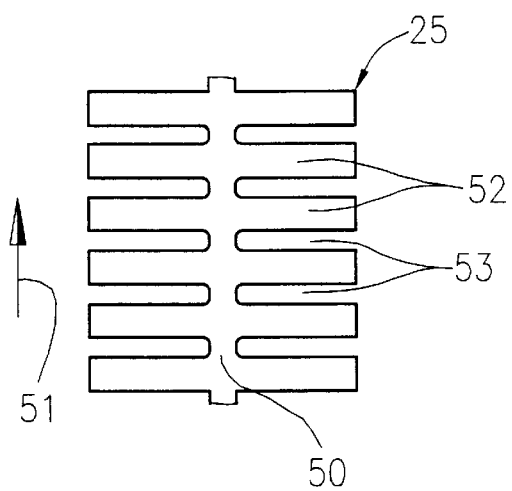
Figure 7:
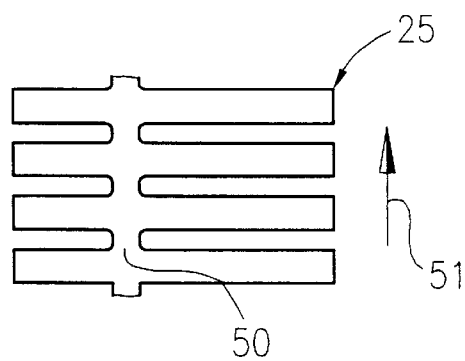

The reinforcements 25 in accordance with FIGS. 6 and 7 comprise in each case a continuous longitudinal cross piece 50 which prevents the reinforcement 25 from extending or upsetting in a longitudinal direction 51. Outside the longitudinal cross- piece 50 are alternating tongues 52 and recesses 53 which render it possible to achieve good three-dimensional bending of the holding section 24 (FIGS. 3 to 5) and the associated sealing section 31.

Figure 8:
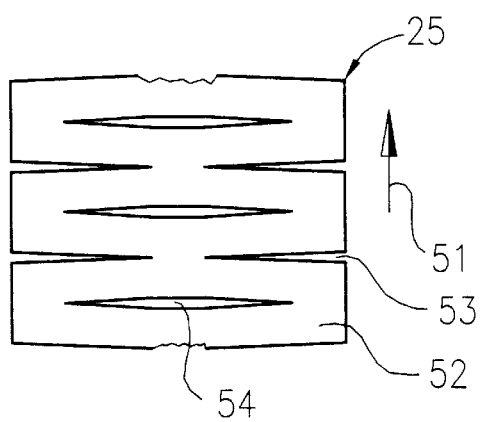
Figure 9:
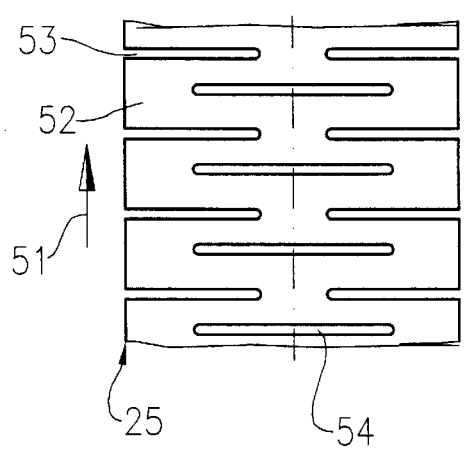

The reinforcements 25 in accordance with FIGS. 8 and 9 comprise in addition transverse slots 54 which also allow the reinforcement 25 to extend or upset in the longitudinal direction 51.

Figure 10:
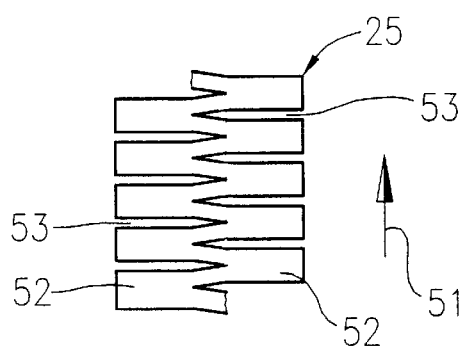

The same effect is achieved as shown in FIG. 10 by virtue of the fact that the recesses 53 overlap transverse to the longitudinal direction 51.

What is claimed is:

1. A three-dimensionally shaped profiled seal for providing a sealing arrangement between a vertically sliding window pane and a roof frame of a cabriolet, said profiled seal being fixedly attachable to a connection part of the roof frame which has an attachment flange and an edge flange, said profiled seal comprising:

a length of profiled elastomer co-extruded with a reinforcement embedded within said profiled elastomer, said reinforcement having a U-shaped cross-section;

a holding section having a substantially U-shaped cross-section and a first limb, said holding section being part of said length of profiled elastomer and includes said U-shaped reinforcement, said holding section capable of being placed on the attachment flange of the connection part in a self-clamping manner, said first limb having a free longitudinal edge; and a sealing section comprising a foot integrally formed onto said first limb, said foot comprising a first longitudinal edge having thereon a longitudinal groove, said first longitudinal edge being adjacent said free longitudinal edge, said edge flange of the roof frame being engageable in said longitudinal groove when the profiled seal is fixedly attached to the connection part.

2. A profiled seal in accordance with claim 1 in combination with said connection part, wherein the edge flange is a component of an outer metal sheet of a roof part of a hard folding roof.

3. A profiled seal in accordance with claim 1 in combination with said connection part, wherein the edge flange is formed on the connection part of the roof frame.

4. A profiled seal in accordance with claim 1, wherein said free longitudinal edge of the first limb is capable of being pressed in cooperation with the edge flange on a sealing surface of the attachment flange.

5. A profiled seal in accordance with claim 2, wherein said free longitudinal edge of the first limb is capable of being pressed in cooperation with the edge flange on a sealing surface of the attachment flange.

6. A profiled seal in accordance with claim 3, wherein said free longitudinal edge of the first limb is capable of being pressed in cooperation with the edge flange on a sealing surface of the attachment flange.

7. A profiled seal in accordance with claim 4, wherein said first limb has a hooked-shaped end lip which protrudes into said longitudinal groove, said end lip positioned to lay prestressed against a supporting surface, facing the sealing surface, of the edge flange when the profiled seal is fixedly attached to the connection part.

8. A profiled seal in accordance with claim 5, wherein said first limb has a hooked-shaped end lip which protrudes into said longitudinal groove, said end lip positioned to lay prestressed against a supporting surface, facing the sealing surface, of the edge flange when the profiled seal is fixedly attached to the connection part.

9. A profiled seal in accordance with claim 6, wherein said first limb has a hooked-shaped end lip which protrudes into said longitudinal groove, said end lip positioned to lay prestressed against a supporting surface, facing the sealing surface, of the edge flange when the profiled seal is fixedly attached to the connection part.

10. A profiled seal in accordance with claim 7, wherein said end lip is configured to engage in a locking manner behind a longitudinal rib of the end flange, which rib extends in a direction of the sealing surface.

11. A profiled seal in accordance with claim 8, wherein said end lip is configured to engage in a locking manner behind a longitudinal rib of the end flange, which rib extends in a direction of the sealing surface.

12. A profiled seal in accordance with claim 9, wherein said end lip is configured to engage in a locking manner behind a longitudinal rib of the end flange, which rib extends in a direction of the sealing surface.

13. A profiled seal in accordance with claim 1, wherein said foot comprises a sealing lip disposed outside said longitudinal groove and which is configured to lay prestressed in a sealing manner against the roof when the profiled seal is fixedly attached to the connection part.

14. A profiled seal in accordance with claim 13 in combination with said connection part and wherein said profiled seal is fixedly attached to the connection part, further comprising a folding roof cover having a cover material which has a longitudinal edge, wherein said sealing lip lies against said longitudinal edge of said cover material.

15. A profiled seal in accordance with claim 13 in combination with said connection part, wherein said profiled seal is fixedly attached to the connection part and the cabriolet has a hard folding roof, wherein said sealing lip lies against an outer metal sheet of a roof part of said hard folding roof.

16. A profiled seal in accordance with claim 1, wherein said length of profiled elastomer has a limb extending outwards at an angle from a second longitudinal edge, remote from the first longitudinal edge, of said foot, and said length of profiled elastomer has a membrane attached between a free longitudinal edge of the limb of said length of profiled elastomer and the first longitudinal edge of the foot and defines a hollow cavity in said length of profiled elastomer.

17. A profiled seal in accordance with claim 16, in combination with said connection part, wherein the window pane comes into contact with said membrane when the pane is in the uppermost region of its travel.

18. A profiled seal in accordance with claim 16, wherein said foot and said limb comprise soft rubber and said membrane comprises expanded rubber.

19. A profiled seal in accordance with claim 17, wherein said foot and said limb comprise soft rubber and the membrane comprises expanded rubber.

20. A profiled seal in accordance with claim 1, wherein said reinforcement comprises a metal punched strip.

21. A profiled seal in accordance with claim 1, wherein said reinforcement comprises a twisted metal wire body.

* * * * *